US012671089B2

(12) United States Patent
Cho et al.

(10) Patent No.: US 12,671,089 B2
(45) Date of Patent: Jun. 30, 2026

(54) BINDER FOR RECHARGEABLE LITHIUM BATTERY, NEGATIVE ELECTRODE INCLUDING SAME, AND RECHARGEABLE LITHIUM BATTERY INCLUDING SAME

(71) Applicants: SAMSUNG SDI CO., LTD., Yongin-si (KR); KOOKMIN UNIVERSITY INDUSTRY ACADEMY COOPERATION FOUNDATION, Seoul (KR)

(72) Inventors: Yunshik Cho, Yongin-si (KR); Jungmin Lee, Yongin-si (KR); Ju-Won Jeon, Seoul (KR); Young Rag Do, Seoul (KR)

(73) Assignees: Samsung SDI Co., Ltd., Yongin-si (KR); Kookmin University Industry Academy Cooperation Foundation, Seoul (KR)

( * ) Notice: Subject to any disclaimer, the term of this patent is extended or adjusted under 35 U.S.C. 154(b) by 630 days.

(21) Appl. No.: 18/186,831

(22) Filed: Mar. 20, 2023

(65) Prior Publication Data

US 2023/0299295 A1 Sep. 21, 2023

(30) Foreign Application Priority Data

Mar. 21, 2022 (KR) ........................ 10-2022-0034886
Mar. 16, 2023 (KR) ........................ 10-2023-0034725

(51) Int. Cl.

| | |
|---|---|
| ***H01M 4/62*** | (2006.01) |
| ***H01M 4/38*** | (2006.01) |
| ***H01M 10/0525*** | (2010.01) |
| ***H01M 10/0565*** | (2010.01) |
| *H01M 4/02* | (2006.01) |

(52) U.S. Cl.

CPC ........... *H01M 4/622* (2013.01); *H01M 4/386* (2013.01); *H01M 10/0525* (2013.01); *H01M 10/0565* (2013.01); *H01M 2004/027* (2013.01); *H01M 2300/0082* (2013.01)

(58) Field of Classification Search

CPC .. H01M 4/622; H01M 4/386; H01M 10/0525; H01M 10/0565

See application file for complete search history.

(56) References Cited

U.S. PATENT DOCUMENTS

| | | | | |
|---|---|---|---|---|
| 2014/0106217 | A1 | 4/2014 | Lee et al. | |
| 2021/0265625 | A1* | 8/2021 | Matsumoto ....... | H01M 10/0569 |
| 2022/0140347 | A1 | 5/2022 | Jeon | |
| 2022/0209237 | A1 | 6/2022 | Kim et al. | |

FOREIGN PATENT DOCUMENTS

| | | | |
|---|---|---|---|
| KR | 10-1698764 | B1 | 1/2017 |
| KR | 10-2021-0054989 | A | 5/2021 |
| KR | 10-2258350 | B1 | 6/2021 |
| KR | 10-2022-0060936 | A | 5/2022 |

* cited by examiner

*Primary Examiner* — Wyatt P McConnell

(74) *Attorney, Agent, or Firm* — Womble Bond Dickinson (US) LLP

(57) ABSTRACT

Disclosed are a binder for a rechargeable lithium battery, a negative electrode including the binder, and a rechargeable lithium battery including the negative electrode. The binder may include a copolymer of a polymer electrolyte, a conductive polymer, and a polydentate chelating agent.

20 Claims, 6 Drawing Sheets

BINDER FOR RECHARGEABLE LITHIUM BATTERY, NEGATIVE ELECTRODE INCLUDING SAME, AND RECHARGEABLE LITHIUM BATTERY INCLUDING SAME

CROSS-REFERENCE TO RELATED APPLICATION

This application claims priority to and the benefit of Korean Patent Application No. 10-2022-0034886 and 10-2023-0034725, filed in the Korean Intellectual Property Office on Mar. 21, 2022, and Mar. 16, 2023, respectively, the entire content of each of which is incorporated herein by reference.

STATEMENT REGARDING KOREAN GOVERNMENT SPONSORED RESEARCH OR DEVELOPMENT

This invention is supported by the Ministry of Science and ICT, Korea, with Grant No. 1711181794 under 2022R1A2C1092273 as mid-career research from Sep. 1, 2022 to Feb. 28, 2026, with a title of "Zwitterionic Polymer-based Ionic Thermoelectric Materials with Autonomous Self-Healing Capability" (KOOKMIN UNIVERSITY INDUSTRY ACADEMY COOPERATION FOUNDATION)

BACKGROUND

1. Field

One or more embodiments of the present disclosure relate to a binder for a rechargeable lithium battery, a negative electrode including the binder, and a rechargeable lithium battery including the negative electrode.

2. Description of the Related Art

Recently, the wide usage of electronic devices such as mobile phones, laptop computers, and electric vehicles has significantly increased demands for rechargeable batteries with relatively high capacity and light weight. For example, a rechargeable lithium battery has recently been drawing much attention as a power source for portable devices because it has relatively light weight and high energy density. Therefore, research for improving performances of the rechargeable lithium battery is being actively conducted.

A rechargeable lithium battery includes a positive electrode and a negative electrode which may respectively include active materials being capable of intercalating and deintercalating lithium ions, and an electrolyte, and generates electrical energy due to an oxidation and reduction reaction when lithium ions are intercalated and deintercalated into and out of the positive electrode and the negative electrode.

As for a positive active material of a rechargeable lithium battery, transition metal compounds such as lithium cobalt oxides, lithium nickel oxides, and/or lithium manganese oxide are mainly utilized.

As a negative active material for a rechargeable lithium battery, a carbon-based active material, especially a crystalline carbonaceous material such as graphite is mainly utilized, but it exhibits a relatively low theoretical capacity of 327 mAh/g. It has been attempted to add silicon, which has a theoretical capacity of 3590 mAh/g, at a small amount of about 5 wt % or less in order improve capacity of such a crystalline carbonaceous material, but it is not sufficient to increase the capacity of the crystalline carbonaceous active material. Furthermore, the addition of silicon at a large amount of 5 wt % or more increases the capacity of the crystalline carbonaceous active material, but deteriorates cycle-life of the battery.

The above information disclosed in this Background section is only for enhancement of understanding of the background of the present disclosure, and therefore it may contain information that does not form the prior art.

SUMMARY

One or more aspects of embodiments of the present disclosure are directed toward a binder for a rechargeable lithium battery capable of improving both (e.g., simultaneously) capacity and cycle-life characteristics of the rechargeable lithium battery.

One or more aspects of embodiments of the present disclosure are directed toward a negative electrode for a rechargeable lithium battery including the binder.

One or more aspects of embodiments of the present disclosure are directed toward a rechargeable lithium battery including the negative electrode.

Additional aspects will be set forth in part in the description which follows and, in part, will be apparent from the description, or may be learned by practice of the presented embodiments of the disclosure.

According to one or more embodiments of the present disclosure, a binder for a rechargeable lithium battery may include a copolymer including a polymer electrolyte, a conductive polymer, and a polydentate chelating agent.

According to one or more embodiments of the present disclosure, a negative electrode for a rechargeable lithium battery may include a negative active material layer including a first binder, a cellulose-based compound, a second binder, and a negative active material, wherein the first binder may include a copolymer including a polymer electrolyte, a conductive polymer, and a polydentate chelating agent.

An amount of the first binder may be about 0.01 wt % to about 30 wt % based on the total weight, 100 wt %, of the negative active material layer.

An amount (e.g., combined amount) of the cellulose-based compound and the second binder may be about 1 wt % to about 30 wt % based on the total weight, 100 wt %, of the negative active material layer.

A mixing ratio of the first binder and (the cellulose-based compound and the second binder) may be about 1:99 to about 99:1 weight ratio.

A mixing ratio of the first binder, the cellulose-based compound, and the second binder may be about 1:0.1 to 10:0.1 to 10 weight ratio.

An amount of the polymer electrolyte may be about 30 wt % to about 95 wt % based on 100 wt % of the first binder, an amount of the conductive polymer may be about 2 wt % to about 60 wt % based on 100 wt % of the first binder, and an amount of the polydentate chelating agent may be about 3 wt to about 68 wt % based on 100 wt % of the first binder.

A mixing ratio of the polymer electrolyte, the conductive polymer, and the polydentate chelating agent may be about 1:0.02 to 10:0.03 to 10 weight ratio.

The polymer electrolyte may be a polymer electrolyte having at least one functional group selected from among a carbonyl group, an undissociated functional group (RH), a carboxylic acid group, a sulfonic acid group, a phosphoric acid group, an ether group, and an amine group. In some embodiments, the polymer electrolyte may be poly(2-acrylamido-2-methyl-1-propanesulfonic acid), polyacrylic acid, poly(methyl methacrylate), or a combination thereof.

The conductive polymer may be poly(3,4-ethylene dioxythiophene), polyaniline, polypyrrole, polyfuran, polythiophene, polyselenophene, 3,4-propylenedioxythiophene-2,5-dicarboxylic acid (ProDOT), or a combination thereof.

The polydentate chelating agent may include 2 to 6 acidic functional groups or basic functional groups, and the acidic functional group or the basic a functional group may be a carboxylic acid group, a sulfonic acid group, a phosphoric acid group, or a hydroxy group. In one or more embodiments, the polydentate chelating agent may be phytic acid, tannic acid, or a combination thereof.

The negative active material may be a silicon-based negative active material.

According to one or more embodiments, a rechargeable lithium battery is provided to include the negative electrode, a positive electrode, and an electrolyte.

The negative active material according to one or more embodiments of the present disclosure may exhibit an excellent or suitable cycle-life characteristic and excellent or suitable high-rate charge and discharge characteristics when the first binder is utilized.

BRIEF DESCRIPTION OF THE DRAWINGS

The accompanying drawing is included to provide a further understanding of the present disclosure, and is incorporated in and constitutes a part of this disclosure. The drawing illustrates example embodiments of the present disclosure and, together with the description, serves to explain principles of present disclosure. In the drawing.

DETAILED DESCRIPTION

Figure 1:
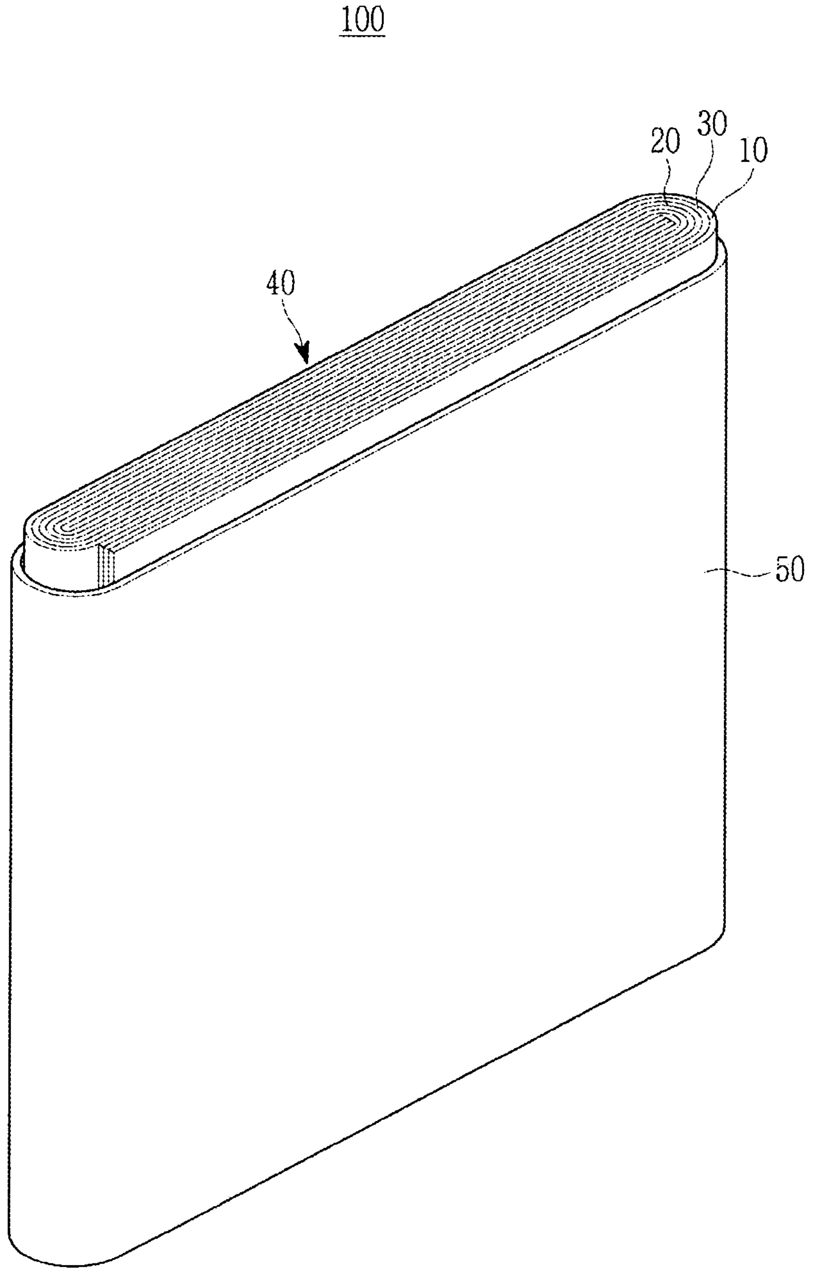
FIG. 1 is a schematic view showing a structure of a rechargeable lithium battery according to one or more embodiments of the present disclosure.

The present disclosure may be modified in many alternate forms, and thus specific embodiments will be exemplified in the drawing and described in more detail. It should be understood, however, that it is not intended to limit the present disclosure to the particular forms disclosed, but rather, is intended to cover all modifications, equivalents, and alternatives falling within the spirit and scope of the present disclosure.

Hereinafter, embodiments of the present disclosure are described in more detail. However, these embodiments are example, the present disclosure is not limited thereto, and the present disclosure is defined by the scope of claims.

In the present disclosure, when a definition is not otherwise provided, such a particle diameter or size (D50) indicates an average particle diameter or size (D50) where a cumulative volume is about 50 volume % in a particle size distribution. Also, in the present disclosure, when particles are spherical, "diameter" indicates a particle diameter or an average particle diameter, and when the particles are non-spherical, the "diameter" indicates a major axis length or an average major axis length. The average particle size (D50) may be measured by a method suitable to those skilled in the art, for example, by a particle size analyzer, or by a transmission electron microscopic image or a scanning electron microscopic image. In some embodiments, a dynamic light-scattering measurement device may be utilized to perform a data analysis, and the number of particles is counted for each particle size range. From the data, the average particle diameter or size (D50) value may be easily obtained through a calculation.

The terms utilized below are only utilized to describe specific embodiments and are not intended to limit the present disclosure. Singular expressions may include plural expressions unless the context clearly indicates otherwise. Hereinafter, it will be further understood that the terms "comprise," "include," or "have" when utilized in the present disclosure, specify the presence of stated features, integers, steps, operations, elements, and/or components, but do not preclude the presence or addition of one or more other features, integers, steps, operations, elements, components, and/or groups thereof. As utilized herein, the terms "and/or" and "or" may include any and all combinations of one or more of the associated listed items. The "/" utilized herein may be interpreted as "and" or as "or" depending on the situation.

A negative electrode for a rechargeable lithium battery according to one or more embodiments of the present disclosure may include a negative active material layer including a first binder, a cellulose-based compound, a second binder, and a negative active material. The first binder may be a copolymer including a polymer electrolyte, a conductive polymer, and a polydentate chelating agent.

The first binder may be a copolymer in which a polymer electrolyte, a conductive polymer, and a polydentate chelating agent are polymerized. In the case of all three components, the desired or suitable self-healing effects, that is, the effects for inhibiting the deterioration of the cycle-life characteristics of the battery due to volume expansion of the negative electrode during charging and discharging, may be effectively obtained and achieved. However, when at least one of the polymer electrolyte, the conductive polymer, or the polydentate chelating agent is not included, the desired or suitable self-healing effect may not be obtained or achieved.

The negative active material layer according to one or more embodiments of the present disclosure may include all of the first binder, the cellulose-based compound, and the second binder. When only the first binder is included during the negative electrode preparation, no suitable slurry dispersion is formed. When only the first binder and the cellulose-based compound are included during the negative electrode preparation, the negative active materials are not well adhered, and the adherence of the negative active material layer to a current collector may be decreased. When only the first binder and the second binder are utilized during the negative electrode preparation, a viscosity of the prepared slurry is insufficient for negative active material layer preparation, so that coating a current collector may not be effectively performed.

In one or more embodiments, an amount of the first binder may be about 0.01 wt % to about 30 wt %, about 0.01 wt % to about 25 wt %, about 0.01 wt % to about 15 wt %, 0.01 wt % to about 5 wt %, about 0.01 wt % to about 3 wt %, or about 0.5 wt % to about 3 wt % based on the total weight, 100 wt %, of the negative active material layer. When the first binder is satisfied in the above range, the self-healing effect, that is, the effect for self-recovering (e.g., self-healing) the cracks of the negative electrode caused by charging and discharging, may be effectively obtained.

A mixed amount of the cellulose-based compound and the second binder may be about 1 wt % to about 30 wt %, about 1 wt % to about 15 wt %, about 1 wt % to about 10 wt %, about 1 wt % to about 7 wt %, about 1 to about 5 wt %, or about 1 to about 3 wt % based on the total weight, 100 wt %, of the negative active material layer. When the mixed amount of the cellulose-based compound and second binder is mixed within the above range, the dispersion of the negative active material and a conductive material may be improved, and the adhesion and the flexibility of the negative electrode may be secured.

In some embodiments, in the negative active material layer, the sum amount of the first binder, the cellulose-based compound, and the second binder may be about 2 wt % to about 60 wt % based on the total weight, 100 wt %, of the negative active material layer, and when the sum amount is within this range, the processability of the negative electrode may be secured, and the prepared negative electrode may have a low resistance characteristic.

In one or more embodiments, a mixing ratio of the first binder, and (the cellulose-based compound and the second binder), i.e., a weight ratio of the first binder: (the cellulose-based compound and the second binder), may be about 1:99 to about 99:1 weight ratio, or about 10:90 to about 90:10 weight ratio, in the negative active material layer. When the mixing ratio of the first binder, and (the cellulose-based compound and the second binder) is within the range, the processability of the negative electrode may be further improved, and the self-healing effect may be further improved or enhanced.

In one or more embodiments, a mixing ratio of the cellulose-based compound and the second binder may be about 10:90 to about 90:10 weight ratio. The mixing ratio of the cellulose-based compound and the second binder within this range allows to secure the dispersion of the negative active material in the negative electrode and adhesion of the negative electrode, thereby further improving the processability of the negative electrode.

In one or more embodiments, in the first binder, an amount of the polymer electrolyte may be about 30 wt % to about 95 wt %, about 30 wt % to about 80 wt %, or about 30 wt % to about 70 wt % based on 100 wt % of the first binder. When the amount of the polymer electrolyte is within the above range, the excellent or suitable negative electrode processability may be obtained, the dispersibility of the slurry for preparing the negative electrode may be excellent or suitable, and high negative electrode adhesion may be obtained and achieved.

In one or more embodiments, in the first binder, an amount of the conductive polymer may be about 2 wt % to about 60 wt %, about 2 wt % to about 40 wt %, or about 10 wt % to about 40 wt % based on 100 wt % of the first binder. The amount of the conductive polymer within the above range renders to improve the conductivity of the negative electrode.

In one or more embodiments, in the first binder, an amount of the polydentate chelating agent may be about 3 wt % to about 68 wt %, about 5 wt % to about 25 wt %, or about 15 wt % to about 40 wt % based on 100 wt % of the first binder. When the amount of the polydentate chelating agent is within the above range, the self-healing performance of the negative electrode may be further improved.

In some embodiments, the polymer electrolyte may be a polymer electrolyte having at least one functional group selected from among a carbonyl group, an undissociated functional group (RH), a carboxylic acid group, a sulfonic acid group, a phosphoric acid group, an ether group, and an amine group. The undissociated functional group (RH) may be carboxylic acid, sulfonic acid, or phosphoric acid group. Non-limiting examples of the polymer electrolyte may be poly(2-acrylamido-2-methyl-1-propanesulfonic acid), poly (meth)acrylic acid, or a combination thereof. In some embodiments, the (meth)acrylic acid may refer to acrylic acid or methacrylic acid.

In some embodiments, the conductive polymer may be poly(3,4-ethylenedioxythiophene (PEDOT), polyaniline, polypyrrole, polyfuran, polythiophene, polyselenophene, 3,4-propylenedioxythiophene-2,5-dicarboxylic acid (ProDOT), or a combination thereof.

In some embodiments, the polydentate chelating agent may have 2 to 6 acidic functional groups or basic functional groups, and the acidic functional group or the basic functional group may be a carboxylic acid group (—COOH), a sulfonic acid group, an amine group, a phosphoric acid group (—$PO_3H_2$), or a hydroxy group (—OH). Non-limiting examples of the polydentate chelating agent may be phytic acid, tannic acid, or a combination thereof.

The first binder according to one or more embodiments of the present disclosure may be a copolymer in which a polymer electrolyte, a conductive polymer, and a polydentate chelating agent may be polymerized, and a weight-average molecular weight (Mw) of the copolymer is not limited, but for example, in some embodiments, may be about 5000 g/mol to about 100,000,000 g/mol.

In one or more embodiments, the first binder may be prepared by polymerizing the polymer electrolyte, the conductive polymer, and the polydentate chelating agent, and the polymerization may be a radical polymerization, but is not limited thereto, and may be any techniques as long as a copolymer may be prepared. In the polymerization, an initiator may be ammonium persulfate, sodium persulfate, potassium persulfate, 2,2-azobis-(2-amidinopropane) dihydrochloride, 2,2-azobis-(N,N-dimethylene) isobutyramidine dihydrochloride, 2-(carbamoylazo) isobutyronitrile, 2,2-azobis [2-(2-imidazoline-2-yl) propane]dihydrochloride, or 4,4-azobis-(4-cyanovaleric acid), or a combination thereof, but embodiments of the present disclosure are not limited thereto.

The cellulose-based compound may be at least one selected from among carboxymethyl cellulose, hydroxypropyl methyl cellulose, methyl cellulose, and an alkali metal salt thereof. The alkali metal may be Na, K, or Li.

The second binder may be a styrene-butadiene rubber (SBR), an acrylated styrene-butadiene rubber (ABR), an acrylonitrile-butadiene rubber, an acryl rubber, a butyl rubber, a fluorine rubber, or a combination thereof.

In one or more embodiments, the negative active material may be a silicon-based negative active material. The effects derived from utilizing the binders of the present disclosure may be more effectively realized when they are applied to the silicon-based negative active material, rather than the carbon-based active material. Although the silicon-based negative active material may improve the current density and high-capacity of the battery, the silicon-based negative active material has the severe volume expansion during charging and discharging to cause generation of cracks in the negative active material layer. The first binder of the present disclosure may effectively inhibit generation of cracks, and may form a substantially uniform negative active material layer when utilized together with the cellulose-based compound and the second binder.

In one or more embodiments, the silicon-based negative active material may be silicon, silicon oxide ($SiO_x$, $0<x<2$), or a silicon-carbon composite including silicon and carbon.

The carbon may be crystalline carbon or amorphous carbon. The crystalline carbon may be natural graphite, artificial graphite, or a combination thereof. The amorphous carbon may be soft carbon, hard carbon, mesophase pitch carbide, sintered cokes, or a combination thereof.

The silicon-based negative active material may include a silicon-based material and amorphous carbon, or may include crystalline carbon, a silicon-based material, and amorphous carbon. In one or more embodiments, the silicon-based material may be silicon (Si) or a silicon oxide ($SiO_x$, $0<x<2$).

When the silicon-based negative active material includes a silicon-based material and amorphous carbon, it may be an agglomerated product of the silicon-based material and amorphous carbon, or may be the silicon-based material coated with the amorphous carbon on the surface of the silicon-based material. In some embodiments, a mixing ratio of the silicon-based material and amorphous carbon may be about 1:99 to about 99:1 weight ratio.

In some embodiments, when the silicon-based negative active material includes crystalline carbon, a silicon-based material, and amorphous carbon, it may be an agglomerated product in which the crystalline carbon and the silicon-based material are agglomerated, and coated with the amorphous carbon. In some embodiments, an amount of the silicon-based material may be about 1 wt % to about 90 wt % based on the total weight, 100 wt %, of the silicon-based negative active material, or in some embodiments, about 3 wt % to about 60 wt %. In one or more embodiments, in the silicon-based negative active material, an amount of the amorphous carbon may be about 5 wt % to about 60 wt % based on the total weight, 100 wt %, of the silicon-based negative active material, and the amount of the crystalline carbon may be about 5 wt % to about 60 wt % based on the total weight, 100 wt %, of the silicon-based negative active material.

In one or more embodiments, in the negative electrode, as the negative active material, a carbon-based negative active material may be further included, together with the silicon-based negative active material. When the silicon-based negative active material is utilized together with the carbon-based negative active material, a mixing ratio of the silicon-based negative active material and the carbon-based negative active material may be about 1:99 to about 99:1 weight ratio. In some embodiments, a mixing ratio of the silicon-based negative active material and the carbon-based negative active material may be about 5:95 to about 20:80 by weight.

The crystalline carbon may be graphite such as unspecified-shaped, plate-shaped, flake-shaped, spherical-shaped, or fiber-shaped natural graphite or artificial graphite, and the amorphous carbon may be soft carbon or hard carbon, mesophase pitch carbide, sintered cokes, and/or the like.

In the negative active material layer, an amount of the negative active material may be about 70 wt % to about 98 wt % based on the total weight, 100 wt %, of the negative active material layer.

In one or more embodiments, the negative active material layer may include a conductive material. When the negative active material layer further includes a conductive material in the negative active material layer, an amount of the negative active material may be about 70 wt % to about 99 wt % based on the total weight, 100 wt %, of the negative active material layer, the sum amount of the first binder, the cellulose-based compound and the second binder may be about 0.99 wt % to about 30 wt % based on the total weight, 100 wt %, of the negative active material layer, and the amount of the conductive material may be about 0.01 wt % to about 20 wt % based on the total weight, 100 wt %, of the negative active material layer.

The conductive material may be included to provide electrical conductivity for the negative electrode. Any electrically conductive material may be utilized as a conductive material unless it causes a chemical change. Non-limiting examples of the conductive material may include: a carbon-based material such as natural graphite, artificial graphite, carbon black, acetylene black, ketjen black, a carbon fiber, and/or the like; a metal-based material of a metal powder or a metal fiber including copper, nickel, aluminum, silver, and/or the like; a conductive polymer such as a polyphenylene derivative; or a mixture thereof.

In one or more embodiments, the negative electrode may include a current collector supporting the negative active material layer. The current collector may include one or more selected from a copper foil, a nickel foil, a stainless steel foil, a titanium foil, a nickel foam, a copper foam, a polymer substrate coated with a conductive metal, and a combination thereof, but is not limited thereto.

In one or more embodiments, a rechargeable lithium battery may include the negative electrode, a positive electrode, and an electrolyte.

The positive electrode may include a current collector and a positive active material layer including a positive active material and formed on the current collector.

The positive active material may include lithiated intercalation compounds that reversibly intercalate and deintercalate lithium ions. For example, one or more composite oxides of a metal selected from cobalt, manganese, nickel, and a combination thereof, and lithium, may be utilized as the positive active material. In one or more embodiments, the positive active material may include a compound represented by one of the following chemical formulae: $Li_aA_{1-b}X_bD_2$ ($0.90\leq a\leq 1.8$, $0\leq b\leq 0.5$); $Li_aA_{1-b}X_bO_{2-c}D_c$ ($0.90\leq a\leq 1.8$, $0\leq b\leq 0.5$, $0\leq c\leq 0.05$); $Li_aE_{1-b}X_bO_{2-c}D_c$ ($0.90\leq a\leq 1.8$, $0\leq b\leq 0.5$, $0\leq c\leq 0.05$); $Li_aE_{2-b}X_bO_{4-c}D_c$ ($0.90\leq a\leq 1.8$, $0\leq b\leq 0.5$, $0\leq c\leq 0.05$); $Li_aNi_{1-b-c}CO_bX_cD_\alpha$ ($0.90\leq a\leq 1.8$, $0\leq b\leq 0.5$, $0\leq c\leq 0.5$, $0<\alpha\leq 2$); $Li_aNi_{1-b-c}CO_bX_cO_{2-\alpha}T_\alpha$ ($0.90\leq a\leq 1.8$, $0\leq b\leq 0.5$, $0\leq c\leq 0.5$, $0<\alpha<2$); $Li_aNi_{1-b-c}CO_bX_cO_{2-\alpha}T_2$ ($0.90\leq a\leq 1.8$, $0\leq b\leq 0.5$, $0\leq c\leq 0.5$, $0<\alpha<2$); $Li_aNi_{1-b-c}Mn_bX_cD_\alpha$ ($0.90\leq a\leq 1.8$, $0\leq b\leq 0.5$, $0\leq c\leq 0.5$, $0<\alpha\leq 2$); $Li_aNi_{1-b-c}Mn_bX_cO_{2-\alpha}T_\alpha$ ($0.90\leq a\leq 1.8$, $0\leq b\leq 0.5$, $0\leq c\leq 0.5$, $0<\alpha<2$); $Li_aNi_{1-b-c}Mn_bX_cO_{2-\alpha}T_2$ ($0.90\leq a\leq 1.8$, $0\leq b\leq 0.5$, $0\leq c\leq 0.5$, $0<\alpha<2$); $Li_aNi_bE_cG_dO_2$ ($0.90\leq a\leq 1.8$, $0\leq b\leq 0.9$, $0\leq c\leq 0.5$, $0.001\leq d\leq 0.1$); $Li_aNi_bCo_cMn_dG_eO_2$ ($0.90\leq a\leq 1.8$, $0\leq b\leq 0.9$, $0\leq c\leq 0.5$, $0\leq d\leq 0.5$, $0\leq e\leq 0.1$); $Li_aNi_bCo_cAl_dG_eO_2$ ($0.90\leq a\leq 1.8$, $0\leq b\leq 0.9$, $0\leq c\leq 0.5$, $0\leq d\leq 0.5$, $0\leq e\leq 0.1$); $Li_aNiG_bO_2$ ($0.90\leq a\leq 1.8$, $0.001\leq b\leq 0.1$); $Li_aCoG_bO_2$ ($0.90\leq a\leq 1.8$, $0.001\leq b\leq 0.1$);

$Li_aMn_{1-g}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $Li_aFePO_4$ ($0.90 \le a \le 1.8$)

In the above chemical formulae, A is selected from nickel (Ni), cobalt (Co), manganese (Mn), and a combination thereof; X is selected from aluminum (Al), Ni, Co, Mn, chromium (Cr), iron (Fe), magnesium (Mg), strontium (Sr), vanadium (V), a rare earth element, and a combination thereof; D is selected from oxygen (O), fluorine (F), sulfur (S), phosphorous (P), and a combination thereof; E is selected from Co, Mn, and a combination thereof; T is selected from F, S, P, and a combination thereof; G is selected from Al, Cr, Mn, Fe, Mg, lanthanum (La), cerium (Ce), Sr, V, and a combination thereof; Q is selected from titanium (Ti), molybdenum (Mo), Mn, and a combination thereof; Z is selected from Cr, V, Fe, scandium (Sc), yttrium (Y), and a combination thereof; and J is selected from V, Cr, Mn, Co, Ni, copper (Cu), and a combination thereof.

In one or more embodiments, the compound included in the positive active material may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, potassium (K), sodium (Na), calcium (Ca), silicon (Si), Ti, V, tin (Sn), germanium (Ge), gallium (Ga), boron (B), arsenic (As), zirconium (Zr), or a mixture thereof. The coating layer may be disposed by a method having no adverse influence on properties of the positive active material by utilizing these elements in the compound. For example, the method may include any coating method such as spray coating, dipping, and/or the like, but will not be illustrated in more detail herein because it is well-utilized in the related field.

In the positive electrode, an amount of the positive active material may be about 90 wt % to about 98 wt % based on the total weight of the positive active material layer.

In one or more embodiments, the positive active material layers may further include a binder and a conductive material. In some embodiments, the amounts of the binder and the conductive material may each be about 1 wt % to about 5 wt % based on the total amount of the positive active material layer.

The binder improves binding properties of positive active material particles with one another and with the current collector. Non-limiting examples thereof may be polyvinyl alcohol, carboxymethyl cellulose, hydroxypropyl cellulose diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene butadiene rubber, an acrylated styrene butadiene rubber, an epoxy resin, nylon, and/or the like, but embodiments of the present disclosure are not limited thereto.

The conductive material may be included to provide electric conductivity for the positive electrode. Any electrically conductive material may be utilized as a conductive material unless it causes a chemical change. Non-limiting examples of the conductive material may include a carbon-based material such as natural graphite, artificial graphite, carbon black, acetylene black, ketjen black, a carbon fiber, and/or the like; a metal-based material of a metal powder or a metal fiber including copper, nickel, aluminum, silver, and/or the like; a conductive polymer such as a polyphenylene derivative; or a mixture thereof.

The current collector may be Al, but embodiments of the present disclosure are not limited thereto.

The electrolyte may include a non-aqueous organic solvent and a lithium salt.

The non-aqueous organic solvent serves as a medium for transmitting/transporting ions taking part in the electrochemical reaction of the battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethyl acetate, methyl propionate, ethyl propionate, decanolide, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. The ketone-based solvent may include cyclohexanone, and/or the like. The alcohol-based solvent may include ethyl alcohol, isopropyl alcohol, and/or the like, and non-limiting examples of the aprotic solvent may include nitriles such as R-CN (where R is a C2 to C20 linear, branched, or cyclic hydrocarbon, or may include a double bond, an aromatic ring, or an ether bond), amides such as dimethylformamide, dioxolanes such as 1,3-dioxolane, sulfolanes, and/or the like.

The non-aqueous organic solvent may be utilized alone or in a mixture. When the non-aqueous organic solvent is utilized in a mixture, the mixture ratio may be controlled or selected in accordance with a desirable battery performance, and it may be well understood to one of ordinary skill in the related art.

In some embodiments, the carbonate-based solvent may include a mixture of a cyclic carbonate and a linear carbonate. The cyclic carbonate and linear carbonate may be mixed together in a volume ratio of about 1:1 to about 1:9. When the mixture of the cyclic carbonate and linear carbonate is utilized as an electrolyte, it may have enhanced performance.

In one or more embodiments, the non-aqueous organic solvent may further include an aromatic hydrocarbon-based solvent as well as the carbonate-based solvent. In some embodiments, the carbonate-based solvent and the aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

Chemical Formula 1

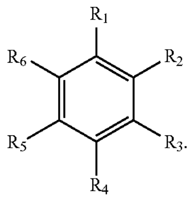

In Chemical Formula 1, $R_1$ to $R_6$ may be the same or different and may each independently be selected from among hydrogen, a halogen, a C1 to C10 alkyl group, a haloalkyl group, and a combination thereof.

Non-limiting examples of the aromatic hydrocarbon-based organic solvent may be selected from among benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In one or more embodiments, the electrolyte may further include vinyl ethyl carbonate, vinylene carbonate, or an ethylene carbonate-based compound represented by Chemical Formula 2, as an additive, for improving cycle life of the battery.

Chemical Formula 2

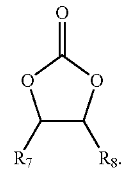

In Chemical Formula 2, $R_7$ and $R_8$ may be the same or different and may each independently be hydrogen, a halogen, a cyano group (CN), a nitro group ($NO_2$), or a C1 to C5 fluoroalkyl group, provided that at least one selected from among $R_7$ and $R_8$ is a halogen, a cyano group (CN), a nitro group ($NO_2$), or a C1 to C5 fluoroalkyl group, and $R_7$ and $R_8$ are not concurrently (e.g., simultaneously) hydrogen.

Non-limiting examples of the ethylene carbonate-based compound may include difluoro ethylene carbonate, chloroethylene carbonate, dichloroethylene carbonate, bromoethylene carbonate, dibromoethylene carbonate, nitroethylene carbonate, cyanoethylene carbonate, and/or fluoroethylene carbonate. In the case of further utilizing the additive for improving cycle life, an amount of the additive may be suitably controlled or selected within an appropriate or suitable range.

The lithium salt dissolved in the non-aqueous organic solvent supplies the battery with lithium Ions, sustains a basic operation of the rechargeable lithium battery, and improves transportation of the lithium ions between the positive and negative electrodes. Non-limiting examples of the lithium salt may include one or more selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis (fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, (where x and y are natural numbers, for example, an integer of about 1 to about 20), lithium difluoro (bisoxolato) phosphate, LiCl, LiI, $LiB(C_2O_4)_2$ (lithium bis(oxalato) borate: LiBOB), and lithium difluoro (oxalato) borate (LIDFOB), as a supporting electrolytic salt. A concentration of the lithium salt may be in a range of about 0.1 M to about 2.0 M. When the lithium salt is included at the above concentration range, the electrolyte may have excellent or suitable performance and lithium ion mobility due to optimal or suitable electrolyte conductivity and viscosity.

A separator may be disposed between the positive electrode and the negative electrode depending on a type or kind of a rechargeable lithium battery. The separator may utilize polyethylene, polypropylene, polyvinylidene fluoride, or multi-layers thereof having two or more layers, and may be a mixed multilayer such as a polyethylene/polypropylene double-layered separator, a polyethylene/polypropylene/polyethylene triple-layered separator, a polypropylene/polyethylene/polypropylene triple-layered separator, and/or the like.

FIG. 1 illustrates an exploded perspective view of a rechargeable lithium battery according to one or more embodiments of the present disclosure. The rechargeable lithium battery according to one or more embodiments of the present disclosure is illustrated as a prismatic battery, but embodiments of the present disclosure are not limited thereto, and may include variously-shaped batteries such as a cylindrical battery, a pouch battery, and/or the like.

Referring to FIG. 1, in one or more embodiments, a rechargeable lithium battery 100 may include an electrode assembly 40 manufactured by winding a separator 30 disposed between a positive electrode 10 and a negative electrode 20, and a case 50 housing the electrode assembly 40. An electrolyte may be impregnated in the positive electrode 10, the negative electrode 20, and the separator 30.

Hereinafter, examples of the present disclosure and comparative examples are described. These examples, however, are not in any sense to be interpreted as limiting the scope of the present disclosure.

Example 1

Polyacrylic acid (PAA), phytic acid (PA), and poly(3,4-ethylene dioxythiophene (PEDOT) were radical polymerized utilizing an ammonium persulfate (APS) initiator, filtrated, and dried to prepare a copolymer of polyacrylic acid (PAA), phytic acid (PA), and 3,4-ethylene dioxythiophene (PEDOT) (a weight-average molecular weight: 1,000,000 g/mol), as a first binder. In the first binder, an amount of the polyacrylic acid was 70 wt % based on 100 wt % of the first binder, an amount of the phytic acid was 20 wt % based on 100 wt % of the first binder, and an amount of poly(3,4-ethylene dioxythiophene) was 10 wt % based on 100 wt % of the first binder.

96 wt % of a mixture of artificial graphite and the silicon-carbon composite as a negative active material (a mixing ratio of artificial graphite and the silicon-carbon composite=96:4 weight ratio), 1 wt % of carboxymethyl cellulose, 1.5 wt % of a styrene-butadiene rubber, and 1.5 wt % of the first binder were mixed in water to prepare a negative active material slurry.

The silicon-carbon composite included an agglomerated product which was secondary particles in which artificial graphite and silicon nanoparticles were agglomerated and a soft carbon coating layer formed on the agglomerated artificial graphite and silicon nanoparticles product, and herein, the amount of the artificial graphite was 60 wt %, the amount of the silicon nanoparticles was 30 wt %, and the amount of the amorphous carbon was 10 wt % based on the total amount of the silicon-carbon composite.

The negative active material slurry was coated on a Cu foil current collector and dried at 110° C. followed by pressurizing it. Thereafter, the obtained product was additionally dried at 140° C. under a vacuum condition for 4 hours to prepare a negative electrode.

Utilizing the negative electrode, a lithium metal counter electrode, and an electrolyte, a half-cell was fabricated. The electrolyte utilized was 1.0 M $LiPF_6$ dissolved in a mixed solvent of ethylene carbonate, ethyl methyl carbonate, and dimethyl carbonate (30:50:20 volume ratio).

Comparative Example 1

A negative electrode and a half-cell were prepared by substantially the same procedure as in Example 1, except that 97.5 wt % of the negative active material utilized in Example 1, 1 wt % of carboxymethyl cellulose, and 1.5 wt % of a styrene-butadiene rubber were mixed in water to prepare a negative active material slurry.

Comparative Example 2

Phytic acid was radical polymerized utilizing an ammonium persulfate (PAS) initiator, filtrated, and dried to prepare a self-healing binder.

A negative electrode and a half-cell were prepared by substantially the same procedure as in Example 1, except for utilizing the self-healing binder.

Experimental Example 1) Measurement of Self-Healing Efficiency

The initial resistance of the negative electrodes according to Example 1 and Comparative Example 1 was measure by the 4-point probe method. The results are shown in Table 1, as $R_{ini}$. The negative electrode was cut (e.g., cut open) to measure the resistance (e.g., of just the negative electrode) via the 4-point probe method. The results are shown in Table 1, as $R_{cut}$.

The cut negative electrode was immersed into an electrolyte in which 1.0 M $LiPF_6$ was dissolved in a mixed solvent of fluoroethylene carbonate and diethyl carbonate (50:50 volume ratio) for 3 hours to cause self-healing and then the resistance was measured. The results are shown in Table 1, as $R_{SH}$.

$SH_{Eff}$ was calculated from the measured $R_{ini}$, $R_{cut}$, and $R_{SH}$ values according to the following Equation 1. The results are shown in Table 1.

$$SH_{Eff}=(1-[(R_{SH}-R_{ini})/(R_{cut}-R_{ini})])*100 \quad \text{Equation 1}$$

TABLE 1

| | Comparative Example 1 | Example 1 |
|---|---|---|
| $R_{ini}$ (kOhm) | 317.77 | 300.07 |
| $R_{cut}$ (kOhm) | 483.66 | 504.13 |
| $R_{SH}$ (kOhm) | 453.46 | 320.32 |
| $SH_{Eff}$ (%) | 18.20 | 90.08 |

As shown in Table 1, the self-healing efficiency ($SH_{Eff}$) of Example 1 exhibited surprisingly higher than that of Comparative Example 1.

Experimental Example 2) Measurement of Self-Healing Effect

For identifying the self-healing effect of the first binder according to Example 1 and the self-healing binder according to Comparative Example 2, films were prepared by utilizing the binder of Example 1 and the binder of Comparative Example 2.

Figure 2:
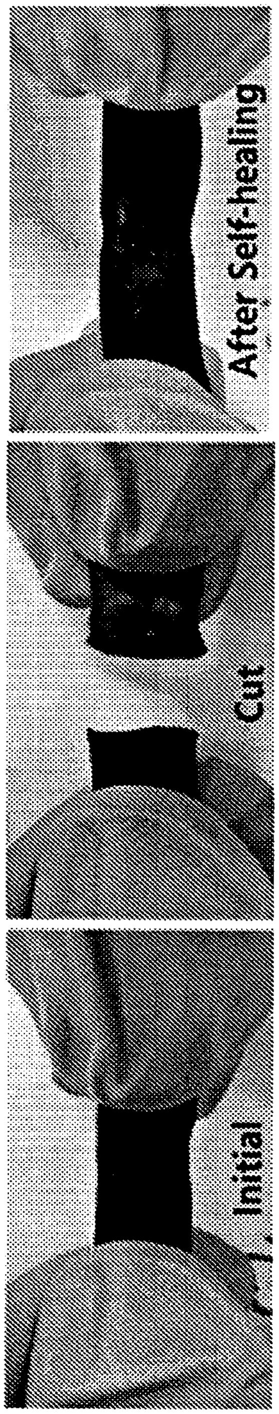
FIG. 2 is an image showing experimental results for examining the self-healing effect of the first binder according to Example 1 of the present disclosure.
Figure 3:
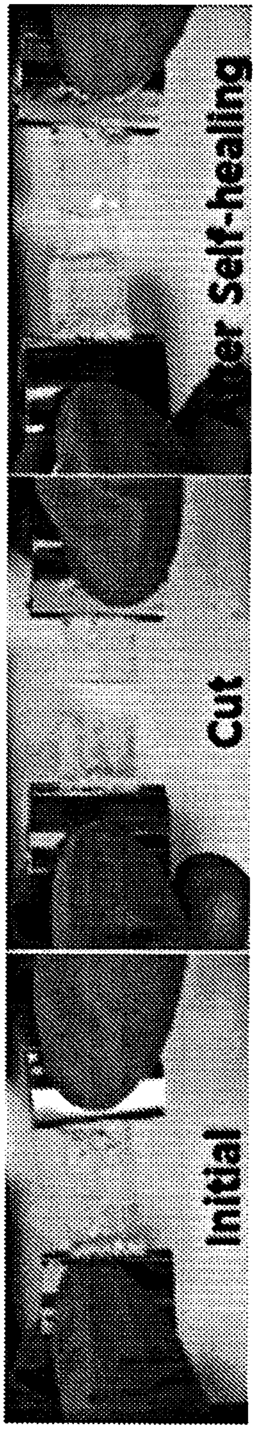
FIG. 3 is an image showing experimental results for examining the self-healing effect of the self-healing binder according to Comparative Example 2 of the present disclosure.

The states of the film just after preparing, after cutting, and after immersing in the electrolyte in which 1.0 M $LiPF_6$ was dissolved in a mixed solvent of fluoroethylene carbonate and diethyl carbonate (50:50 volume ratio) for 3 hours are shown in FIG. 2 and FIG. 3, respectively.

As shown in FIG. 2, the self-healing of the first binder according to Example 1 was effectively evident, and thus, a cut portion is substantially invisible in an attached state. However, as shown in FIG. 3, self-healing did not occur well in the binder of Comparative Example 2, and thus, a cut portion is clearly shown.

For identifying the self-healing effect of the negative electrodes according to Example 1 and Comparative Example 1, the states of negative electrodes according to Example 1 and Comparative Example 1 after cutting (A), and after immersing (B) in the electrolyte in which 1.0 M $LiPF_6$ was dissolved in a mixed solvent of fluoroethylene carbonate and diethyl carbonate (50:50 volume ratio) for 3 hours are shown in FIGS. 4A-4B and FIGS. 5A-5B, respectively.

Figures 4A, 4B:
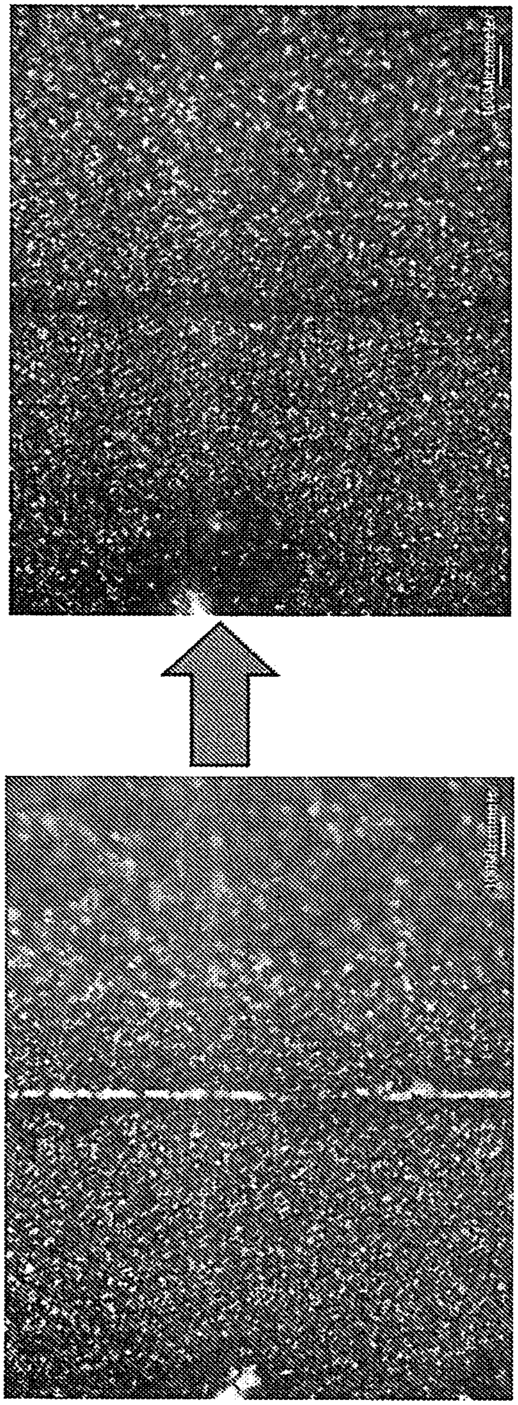
FIGS. 4A and 4B are images showing experimental results for examining the self-healing effect of the negative electrode according to Example 1 of the present disclosure.
Figure 5A:
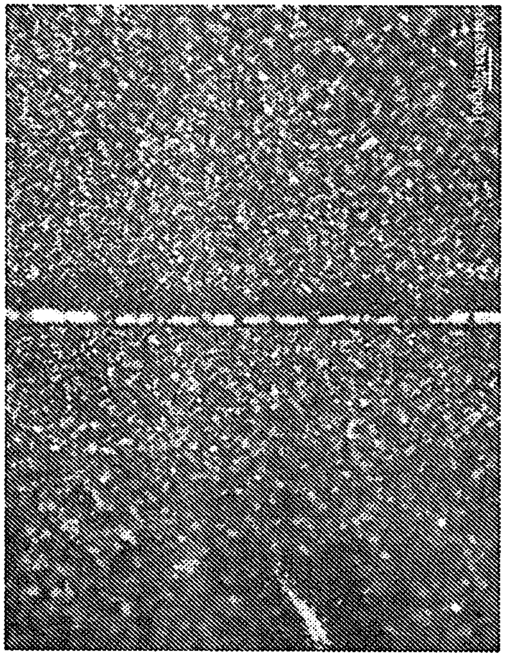
FIGS. 5A and 5B are images showing experimental results for examining the self-healing effect of the negative electrode according to Comparative Example 1 of the present disclosure.
Figure 5B:
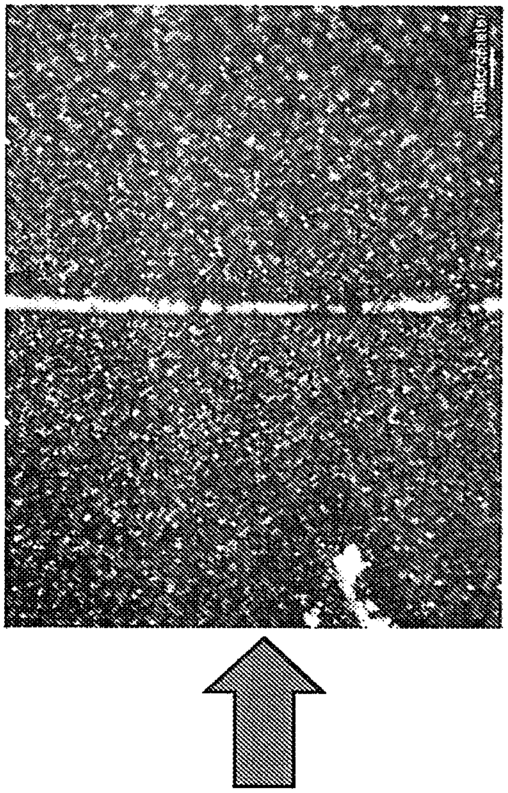

As shown in FIG. 5A and FIG. 5B, Comparative Example 1 using carboxymethyl cellulose and a styrene-butadiene rubber maintained the cut portion. However, as shown in FIG. 4A and FIG. 4B, the negative electrode according to Example 1 was that the cut portion was again attached owing to the self-healing effect, and thus, the cut portion are substantially and rarely invisible in an attached state.

Experimental Example 3) Measurement of Cycle-Life Characteristic

The half-cells according to Example 1 and Comparative Example 1 were charged and discharged at 0.5 C for 100 cycles. A ratio of discharge capacity at each cycle to discharge capacity at $1^{st}$ cycle (i.e., capacity retention) were measured. The results are shown in FIG. 6.

Figure 6:
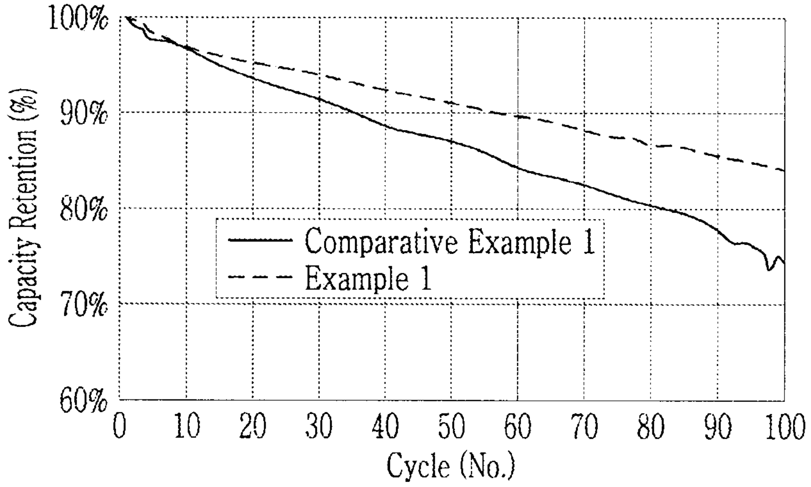
FIG. 6 is a graph showing capacity retention of the half-cells according to Example 1 and Comparative Example 1 of the present disclosure.

As shown in FIG. 6, the half-cell of Example 1 utilizing the first binder exhibited better capacity retention, compared to Comparative Example 1 without utilizing the first binder.

Throughout the disclosure, when a component such as a layer, a film, a region, or a plate is mentioned to be placed "on" another component, it will be understood that it may be directly on another component or that another component may be interposed therebetween.

Throughout the disclosure, although the terms "first," "second," etc., may be utilized herein to describe one or more elements, components, regions, and/or layers, these elements, components, regions, and/or layers should not be limited by these terms. These terms are only utilized to distinguish one component from another component.

As utilized herein, the singular forms "a," "an," and "the" are intended to include the plural forms as well, unless the context clearly indicates otherwise. Further, the use of "may" when describing embodiments of the present disclosure may refer to "one or more embodiments of the present disclosure".

As utilized herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the present disclosure has been described in connection with what is presently considered to be practical example embodiments, it is to be understood that the present disclosure is not limited to the disclosed embodiments, but, on the contrary, is intended to cover one or more suitable modifications and equivalent arrangements included within the spirit and scope of the appended claims and equivalents thereof.

What is claimed is:

1. A binder for a rechargeable lithium battery, the binder comprising:

a copolymer, the copolymer being a polymerized product of a polymer electrolyte, a conductive polymer, and a polydentate chelating agent.

2. A negative electrode for a rechargeable lithium battery, the negative electrode comprising:

a negative active material layer comprising a first binder, a cellulose-based compound, a second binder, and a negative active material, wherein the first binder comprises a copolymer, the copolymer being a polymerized product of a polymer electrolyte, a conductive polymer, and a polydentate chelating agent.

3. The negative electrode of claim 2, wherein an amount of the first binder is about 0.01 wt % to about 30 wt % based on the total weight, 100 wt %, of the negative active material layer.

4. The negative electrode of claim 2, wherein a mixed amount of the cellulose-based compound and the second binder is about 1 wt % to about 30 wt % based on the total weight, 100 wt %, of the negative active material layer.

5. The negative electrode of claim 2, wherein a mixing ratio of the first binder and (the cellulose-based compound and the second binder) is about 1:99 to about 99:1 weight ratio.

6. The negative electrode of claim 2, wherein an amount of the polymer electrolyte is about 30 wt % to about 95 wt % based on 100 wt % of the first binder, an amount of the conductive polymer is about 2 wt % to about 60 wt % based on 100 wt % of the first binder, and an amount of the polydentate chelating agent is about 3 wt to about 68 wt % based on 100 wt % of the first binder.

7. The negative electrode of claim 2, wherein a mixing ratio of the polymer electrolyte, the conductive polymer, and the polydentate chelating agent is about 1:0.02 to 10:0.03 to 10 weight ratio.

8. The negative electrode of claim 2, wherein the polymer electrolyte comprises a polymer electrolyte having at least one functional group selected from among a carbonyl group, an undissociated functional group (RH), a carboxylic acid group, a sulfonic acid group, a, phosphoric acid group, an ether group, and an amine group.

9. The negative electrode of claim 2, wherein the polymer electrolyte comprises poly(2-acrylamido-2-methyl-1-propanesulfonic acid), polyacrylic acid, poly(meth)acrylic acid, or a combination thereof.

10. The negative electrode of claim 2, wherein the conductive polymer comprises poly(3,4-ethylene dioxythiophene), polyaniline, polypyrrole, polyfuran, polythiophene, polyselenophene, 3,4-propylenedioxythiophene-2,5-dicarboxylic acid (ProDOT), or a combination thereof.

11. The negative electrode of claim 2, wherein:

the polydentate chelating agent comprises 2 to 6 acidic functional groups or basic functional groups.

12. The negative electrode of claim 11, wherein:

the acidic functional group or the basic functional group is a carboxylic acid group, a sulfonic acid group, a phosphoric acid group, or a hydroxy group.

13. The negative electrode of claim 2, wherein the polydentate chelating agent comprises phytic acid, tannic acid, or a combination thereof.

14. The negative electrode of claim 2, wherein the negative active material comprises a silicon-based negative active material.

15. A rechargeable lithium battery, comprising:

the negative electrode of claim 2;

a positive electrode; and an electrolyte.

16. The rechargeable lithium battery of claim 15, wherein an amount of the first binder is about 0.01 wt % to about 30 wt % based on the total weight, 100 wt %, of the negative active material layer.

17. The rechargeable lithium battery of claim 15, wherein a mixed amount of the cellulose-based compound and the second binder is about 1 wt % to about 30 wt % based on the total weight, 100 wt %, of the negative active material layer.

18. The rechargeable lithium battery of claim 15, wherein a mixing ratio of the first binder and (the cellulose-based compound and the second binder) is about 1:99 to about 99:1 weight ratio.

19. The rechargeable lithium battery of claim 15, wherein an amount of the polymer electrolyte is about 30 wt % to about 95 wt % based on 100 wt % of the first binder, an amount of the conductive polymer is about 2 wt % to about 60 wt % based on 100 wt % of the first binder, and an amount of the polydentate chelating agent is about 3 wt to about 68 wt % based on 100 wt % of the first binder.

20. The rechargeable lithium battery of claim 15, wherein the negative active material comprises a silicon-based negative active material.

* * * * *